United States Patent [19]

Esper

[11] Patent Number: 5,085,029
[45] Date of Patent: Feb. 4, 1992

[54] CARTON TOP SEALING MECHANISM

[75] Inventor: Leo J. Esper, Troy, Mich.

[73] Assignee: Elopak Systems A.G., Glattbrugg, Switzerland

[21] Appl. No.: 622,005

[22] Filed: Dec. 4, 1990

[51] Int. Cl.⁵ .............................................. B65B 51/14
[52] U.S. Cl. .................... 53/374.8; 100/269 A; 156/583.3
[58] Field of Search ................ 100/269 A; 156/583.3; 53/373.7, 374.3, 374.8, 375.3

[56] References Cited

U.S. PATENT DOCUMENTS

| | | | |
|---|---|---|---|
| 2,634,773 | 4/1953 | Weyant | 100/269 A |
| 2,641,304 | 6/1953 | Biddinger et al. | 53/374.8 X |
| 2,859,796 | 11/1958 | Taunton | 53/479 X |
| 2,967,387 | 1/1961 | Barnes | 53/373.7 |
| 3,808,968 | 5/1974 | Notin | 100/269 A X |
| 3,992,850 | 11/1976 | Vetter | 53/510 |
| 4,145,236 | 3/1979 | Neumayer et al. | 53/373.7 X |
| 4,167,092 | 9/1979 | Medwed | 53/511 X |
| 4,190,484 | 2/1980 | Pohl | 100/269 A X |
| 4,193,341 | 3/1980 | Clements et al. | 100/269 A X |
| 4,581,873 | 4/1986 | Knuppertz et al. | 53/374.8 |
| 4,767,492 | 8/1988 | Fukusima et al. | 53/373.7 X |

FOREIGN PATENT DOCUMENTS 2608777 9/1977 Fed. Rep. of Germany ........ 53/373

Primary Examiner—R. L. Spruill
Assistant Examiner—Daniel B. Moon
Attorney, Agent, or Firm—John P. Moran

[57] ABSTRACT

A carton top sealing mechanism for use in processing thermoplastic coated paperboard cartons on a forming, filling and sealing machine. The top sealing mechanism includes oppositely disposed fixed and movable sealing jaws, between which heated adjacent sealing fins of a gable top carton are positioned. A pneumatic bladder or membrane is operatively connected to the movable sealing jaw to move same upon being inflated to thereby squeeze the sealing fins between the jaws and seal same together.

5 Claims, 4 Drawing Sheets

CARTON TOP SEALING MECHANISM

TECHNICAL FIELD

This invention relates generally to carton top sealing mechanisms and, more particularly, to a carton top sealing mechanism utilizing a pneumatic membrane.

BACKGROUND ART

Currently, paperboard gable top carton seals are created in the following manner. The plastic coating on the paperboard carton is heat activated in any suitable manner, such as hot air, radiated heat, ultrasonic vibration, to a point at which the plastic is tacky. The carton panels are folded and guided together, and then squeezed and cooled, until the seal takes a set. Sufficient pressure must be applied during the sealing operation, to extrude the softened plastic, to fill the pockets and voids created by the folded and abutting multiple paperboard layers.

Depending upon the number of cartons to be squeezed at one time, several hundred to a few thousand pounds of force must be transmitted to the jaws, to generate this pressure. The stroke requirement for the jaws is approximately ¼ inch.

The force applied to the jaws to squeeze the cartons, is generated by either a straight push, or a leverage/linkage driven design. The straight push design requires large, relatively expensive pneumatic cylinders to push the sealing jaws. The leverage/linkage driven designs can utilize smaller pneumatic cylinders, or a cam, to actuate a linkage system, utilizing leverage ratios to generate the required force at the sealing jaws. However, the linkage components, pivot mounts, and lubrication requirements, are generally quite expensive for this method also.

Langen U.S. Pat. No. 4,735,031, includes a pressing punch (FIGS. 13 and 14) which is pushed by a flexible hose or tube containing a medium under a definite pressure toward a pressing table 55 to weld two folded-over layers of a container collar together.

Taunton U.S. Pat. No. 2,859,796 discloses two flexible tubes (FIGS. 3 and 4) which, when inflated, moves heated resilient material into engagement with a workpiece, such as two plies of heat-sealable ends of a pouch, to seal same.

Notin U.S. Pat. No. 3,808,968 is typical of press devices wherein inflatable hoses are utilized in conjunction with platens to bind two superposed flat articles.

DISCLOSURE OF THE INVENTION

A general object of the invention is to provide an improved efficient and simplified carton top sealing mechanism.

Another object of the invention is to provide an improved carton top sealing mechanism utilizing a pneumatic membrane, in lieu of mechanical drives or air cylinders, to actuate oppositely disposed sealer jaws.

A further object of the invention is to provide a carton top sealing mechanism wherein a pneumatically actuated membrane is operatively connected to a movable sealing jaw urging same into engagement with carton gable top sealing panels positioned between the movable jaw and a stationary jaw.

These and other objects and advantages of the invention will become more apparent when reference is made to the following drawings and the accompanying description.

BEST MODE OF CARRYING OUT THE INVENTION

Figure 1:
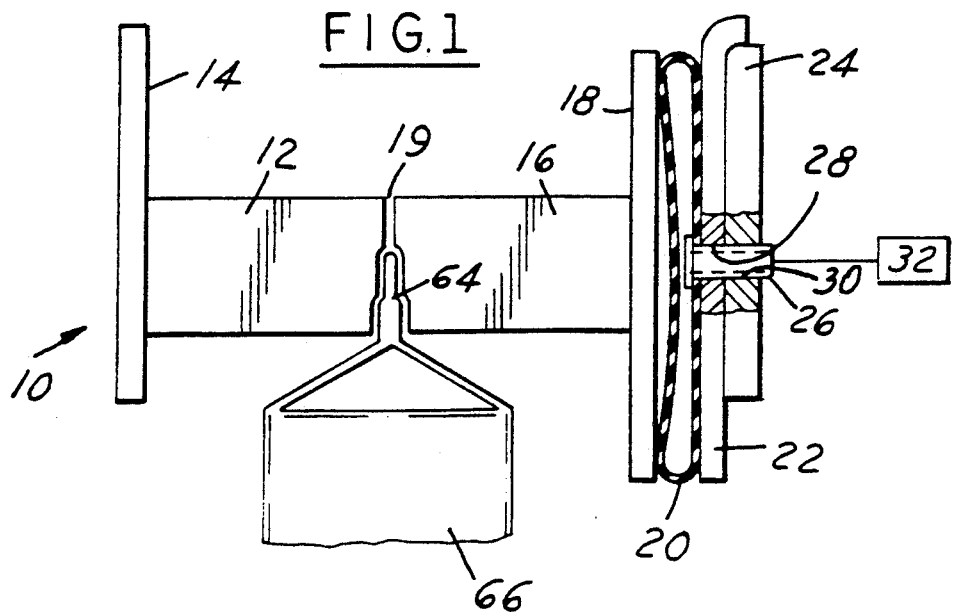
FIG. 1 is a fragmentary side elevational schematic view of a carton top sealing mechanism embodying the invention.

Referring now to the drawings in greater detail, FIG. 1 illustrates a carton top sealing mechanism 10 including a horizontally oriented stationary jaw 12 extending from a fixed support member 14. An oppositely disposed, horizontally oriented movable jaw 16 extends from a movable pressure plate 18. It is well-known that the oppositely disposed faces 19 of respective sealing jaws may be contoured to accommodate a variable thicknesses therebetween.

A pneumatic bladder or membrane 20 is mounted between the movable pressure plate 18 and a fixed pressure plate 22 secured to a support member 24. An inlet tube 26 extends from the pneumatic membrane 20 through aligned openings 28 and 30 formed in the pressure plate 22 and the support member 24, respectively. The inlet tube 26 is connected to a source of air under pressure, represented as 32.

Figure 2:
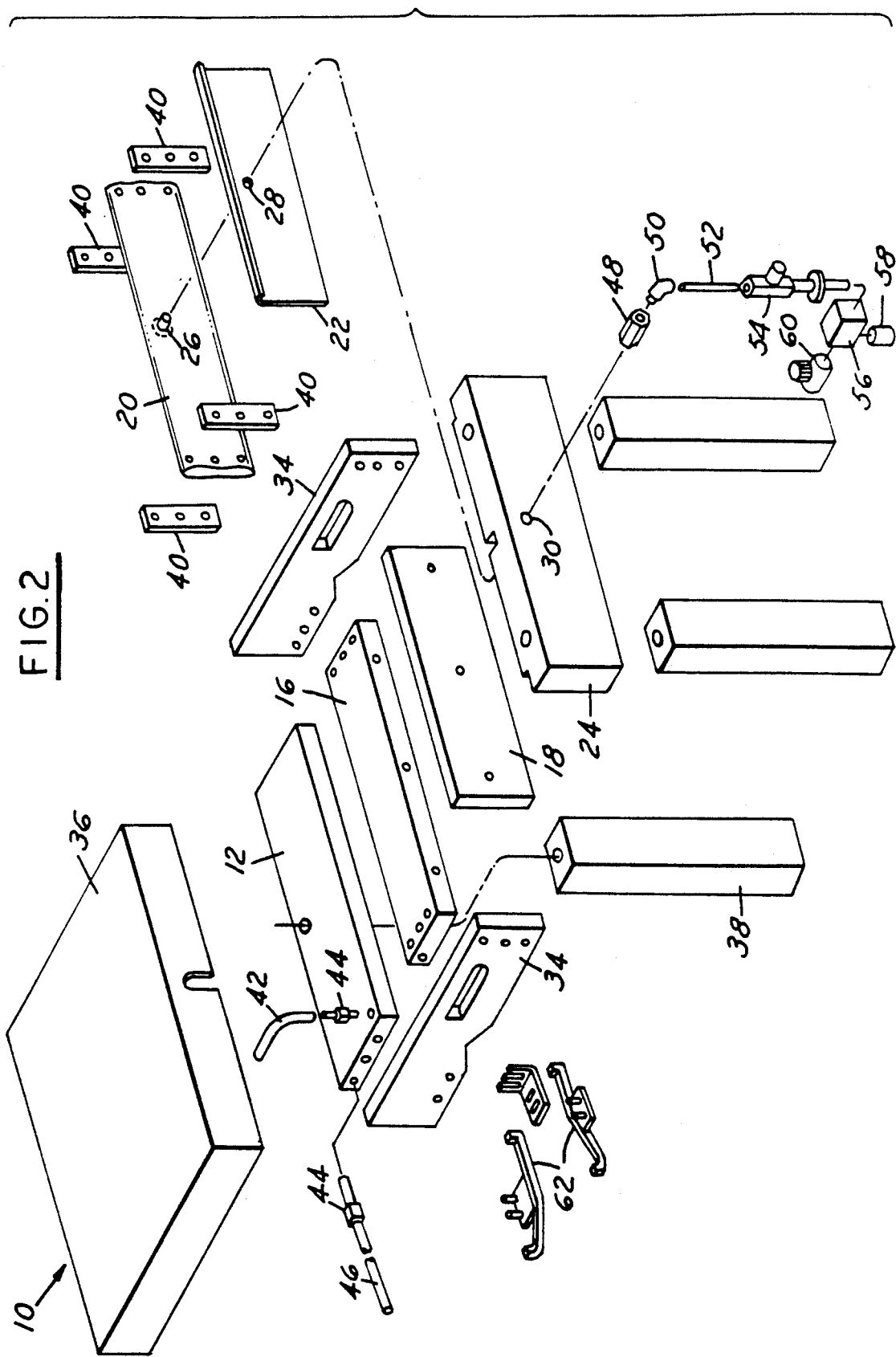
FIG. 2 is an exploded view of a carton top sealing mechanism embodying the invention.

FIG. 2 illustrates the above referenced elements 12, 16, 18, 20, 22, 24, 26, 28 and 30 in more detail, along with a pair of oppositely disposed side support members 34, a cover member 36, supporting legs 38, and two pairs of pinch blocks 40 positioned at opposite ends of the pneumatic membrane 20 between the movable and fixed pressure plates 18 and 22, respectively.

For water cooled stationary and moving jaws 12 and 16, respectively, a coolant line 42, suitable fittings 44, and a return line 46 would be provided for each.

In between the inlet tube 26 and the source 32 of air under pressure, various typical pneumatic connector and control components are utilized such as a nut 48, an elbow 50, a tube 52, a speed control unit 54, a pneumatic valve 56, a muffler 58, and a pressure regulator 60.

Suitable converging closing rails 62 (FIG. 2) may serve to bring the usual sealing fins 64 of a gable top carton 66 into close proximity to one another just before entering the space between the jaws 12 and 16, preventing any jam therewith.

Figure 3:
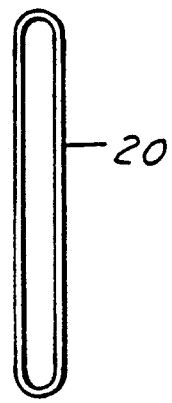
FIG. 3 is a cross-sectional view of the pneumatic membrane component of the carton top sealing mechanism in one operational condition.
Figure 4:
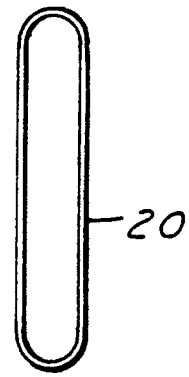
FIG. 4 is a cross-sectional view of the pneumatic membrane component of the carton top sealing mechanism in another operational condition.

In operation, once the sealing fins 64 (FIG. 1) of a typical gable top carton 66 are indexed into a position intermediate the spaced-apart stationary and movable sealing jaws 12 and 16, respectively, a suitable signal is transmitted to the pneumatic valve 56. The pressure regulator 60 supplies a predetermined pressure, e.g., 65 psi, via the tube 52, elbow 50, and inlet tube 26 to the interior of the membrane 20, to thereby cause the latter to expand from a condition represented in FIG. 3 to that represented in FIG. 4, resulting in approximately ¼ inch of horizontal stroke.

This actuation forces the movable jaw 16 laterally to engage the container sealing fins 64 between the fixed and movable jaws 12 and 16, respectively. Inasmuch as, in the usual forming, filling and sealing machine, the sealing fins 64 of thermoplastic coated paperboard cartons 66 are heated prior to entering the sealing area, the resultant squeezing operation between the jaws 12 and 16 serves to create a liquid tight seal between the sealing fins.

As may be noted from FIG. 2, a predetermined plurality of aligned cartons 66 may be indexed by a conventional conveyor (not shown) into position between the oppositely disposed jaws 12 and 16, along the lengths thereof, prior to causing the expansion of the pneumatic membrane 20.

Figure 6A:
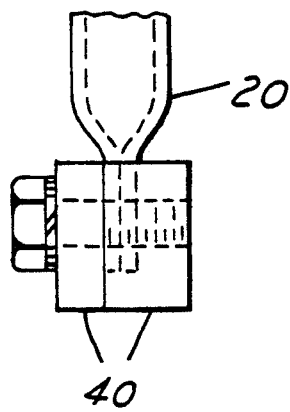
FIG. 6A is an enlarged view of a portion of the FIG. 6 structure.
Figure 5:
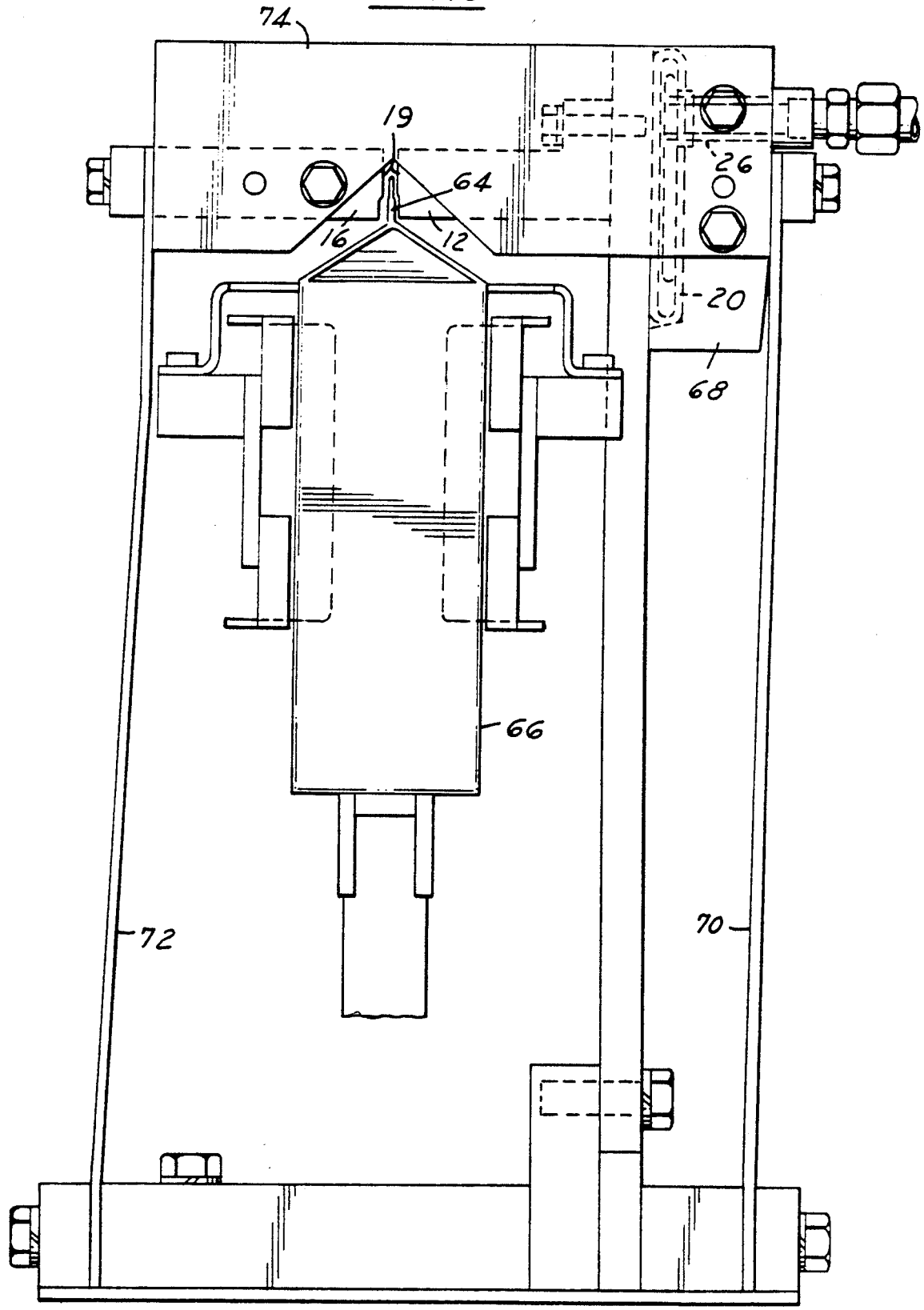
FIG. 5 is a side elevational view in partial cross-section, similar to FIG. 1, illustrating an alternate embodiment of the invention.
Figure 6:
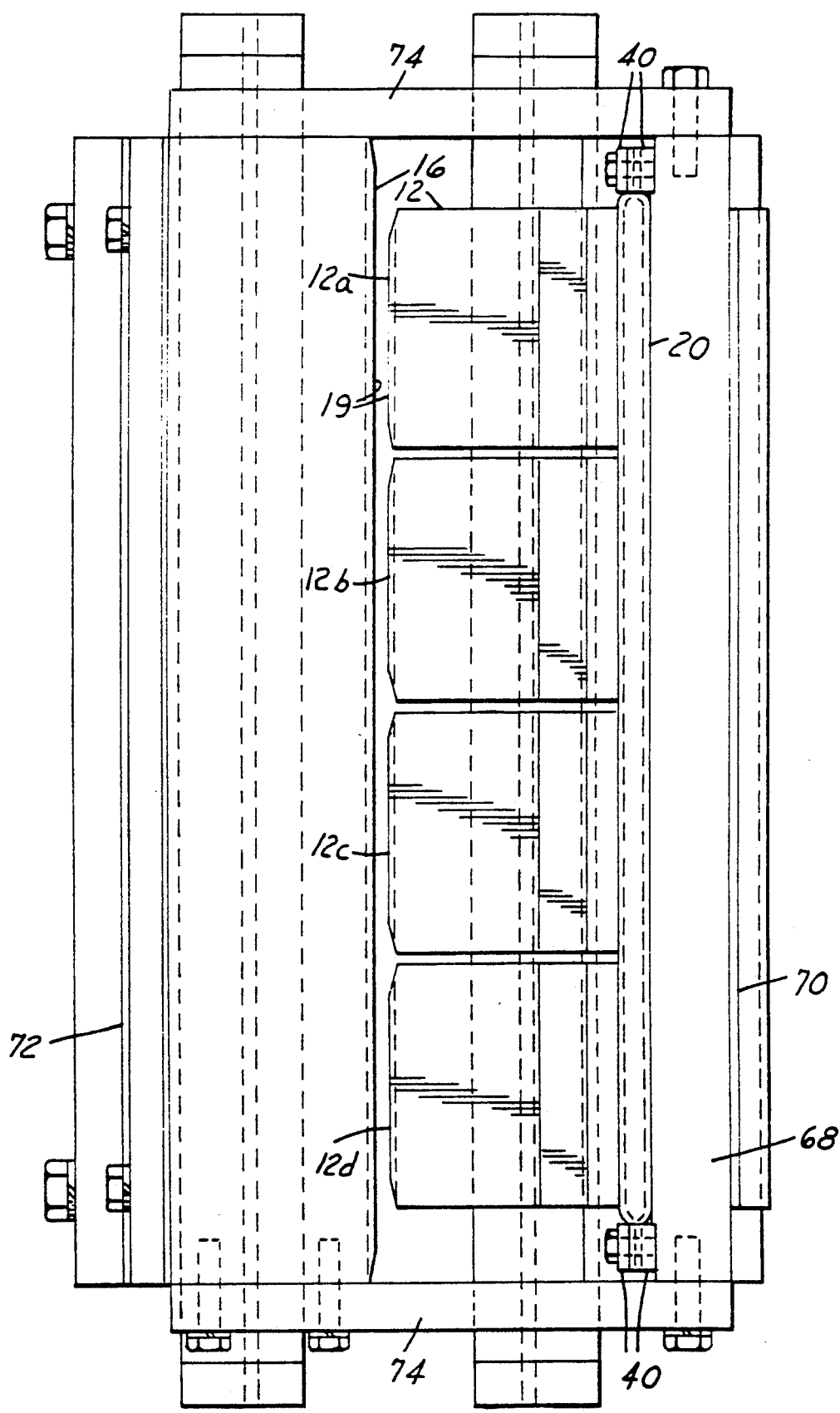
FIG. 6 is a top view of the FIG. 5 structure.

Referring now to FIGS. 5, 6 and 6A, there is shown an alternate embodiment wherein all elements comparable to elements of the FIG. 1–4 embodiment bear the same reference numerals. In addition, it will be noted that the positions of the stationary and movable jaws 12 and 16, respectively, have been reversed. In this embodiment, the membrane 20 expands to the right in FIG. 5, moving a movable pressure plate 68 to the right, against the force of a spring support member 70 supporting the pressure plate 68, causing connector plates 74 to move the movable jaw 16 to the right to engage the sealing fins 64 between the oppositely disposed faces 19 to seal same. This action bows a second spring support member 72 serving to support the movable jaw 16. Once the membrane is deflated, the spring members 70 and 72 return the pressure plate 68 and the movable jaw 16 to their respective leftward positions.

As shown in FIG. 6, it is more apparent that from one to four cartons 66 may be aligned between and sealed by the action of the movable jaw 16, against the fixed jaw 12. The latter, in this embodiment, is formed to include four semi-rigidly fixed segments 12a, 12b, 12c and 12d, which are adapted to permit three cartons, for example, to be sealed in the event there is a fourth defective carton in place.

As shown in FIG. 6A, the ends of the membrane 20 are shown confined between the oppositely disposed pinch blocks 40.

INDUSTRIAL APPLICABILITY

It should be apparent that the invention provides an efficient and simplified carton top sealing mechanism for use with heat activated thermoplastic coated paperboard cartons processed on conventional forming, filling and sealing machines. More specifically, the geometric "footprint" or area of the pneumatic membrane is such that it is applied uniformly to the movable sealing jaw to thus permit more compact machine designs. Additionally, since the membrane does not include any frictional or rubbing components, smoother and more readily repeatable stroke acceleration characteristics are possible as compared to mechanical or air cylinder type drive arrangements. Furthermore, the membrane, being an unconstrained device, does not require critical mounting or alignment.

While but two embodiments of the invention have been shown and described, other modifications thereof are possible within the scope of the following claims.

The embodiments of the invention in which an exclusive property or privilege is claimed are defined as follows:

1. A sealing mechanism for sealing the top sealing fins of thermoplastic coated paperboard cartons, said mechanism comprising a fixed sealing jaw, an oppositely disposed movable sealing jaw, an enclosed expandable bladder operatively connected to said movable sealing jaw, and means communicating with the inside of said bladder for expanding same when said top sealing fins are positioned intermediate the fixed and movable jaws, to thereby move said movable sealing jaw and squeeze the sealing fins between the movable and fixed jaws to seal same, and converging rails positioned so as to urge said sealing fins into close proximity to one another in order to enter intermediate said fixed and movable sealing jaws.

2. The sealing mechanism described in claim 1, and further comprising a pair of fixed and movable pressure plates for confining said expandable bladder therebetween, said movable pressure plate being operatively connected to said movable sealing jaw, and a pair of spring support members for supporting said movable pressure plate and said movable sealing jaw, respectively, serving to move said movable pressure plate and said movable sealing jaw when said expandable bladder is deflated.

3. The sealing mechanism described in claim 2, wherein one of said sealing jaws is segmented into a plurality of separate jaws for sealing any number of cartons up to and including said plurality.

4. The sealing mechanism described in claim 3, wherein said plurality of separate jaws is four jaws.

5. The sealing mechanism described in claim 3, wherein said one of said sealing jaws is said fixed sealing jaw.

* * * * *